(12) United States Patent
Hart et al.

(10) Patent No.: US 8,705,502 B2
(45) Date of Patent: Apr. 22, 2014

(54) USING ENCAPSULATION TO ENABLE 802.1 BRIDGING ACROSS 802.11 LINKS

(75) Inventors: Brian Hart, Sunnyvale, CA (US); Norman Finn, Livermore, CA (US); Andrew Myles, Turramurra (AU)

(73) Assignee: Cisco Technology, Inc., San Jose, CA (US)

( * ) Notice: Subject to any disclaimer, the term of this patent is extended or adjusted under 35 U.S.C. 154(b) by 746 days.

(21) Appl. No.: 12/908,408

(22) Filed: Oct. 20, 2010

(65) Prior Publication Data

US 2012/0099567 A1 Apr. 26, 2012

(51) Int. Cl.
*H04W 4/00* (2009.01)

(52) U.S. Cl.
USPC .......................................... 370/338; 370/312

(58) Field of Classification Search
USPC ......................................................... 370/338
See application file for complete search history.

(56) References Cited

U.S. PATENT DOCUMENTS

| | | | |
|---|---|---|---|
| 7,574,539 B2 | 8/2009 | Trainin | |
| 7,606,177 B1 * | 10/2009 | Mahajan et al. | 370/256 |
| 2004/0109450 A1 * | 6/2004 | Kang et al. | 370/390 |
| 2005/0256972 A1 * | 11/2005 | Cochran et al. | 709/245 |
| 2006/0083254 A1 * | 4/2006 | Ge et al. | 370/401 |
| 2006/0143300 A1 * | 6/2006 | See et al. | 709/227 |
| 2007/0248067 A1 * | 10/2007 | Banerjea et al. | 370/338 |
| 2009/0190515 A1 * | 7/2009 | Finn et al. | 370/312 |
| 2012/0099567 A1 * | 4/2012 | Hart et al. | 370/338 |

OTHER PUBLICATIONS

Wireless Bridges "Problems with Integrating Bridging into 802.11 access points an stations", Norman Finn, Cisco Technology, Inc., Jul. 2007.
Point-to-Multipoint Bridging "Integrating Emulated LAN shared media and point-to-multipoint technologies into standard bridges", Norman Finn, Cisco Technology, Inc., Jul. 2007.

* cited by examiner

*Primary Examiner* — Gerald Smarth
(74) *Attorney, Agent, or Firm* — Tucker Ellis LLP (57) ABSTRACT

In an example embodiment, packet encapsulation is employed to facilitate bridging between bridge ports that do not reflect frames (such as 802.1 compatible bridge ports) and bridge ports that do reflect frames (such as 802.11 compatible clients). Packets from a wireless access point may be sent twice, once with a predefined multicast address for processing by 802.11 clients contained in bridges, and once with the original destination address. In particular embodiments, additional means may be employed to minimize the circumstances where packets are duplicated.

17 Claims, 8 Drawing Sheets

USING ENCAPSULATION TO ENABLE 802.1 BRIDGING ACROSS 802.11 LINKS

TECHNICAL FIELD

The present disclosure relates generally to wireless networking.

BACKGROUND

Some networks, such as a small studio or home network may comprise an arbitrary collection of devices with many different Ethernet-like links such as (Institute of Electrical and Electronics Engineers) IEEE 802.3, IEEE 802.11 (802.11), MoCA (Multi-Media over Coax) compatible links. To ensure connectivity, every device with multiple links can be a bridge (e.g., an 802.1 bridge). For example, a device wirelessly attached to an access point (AP) may also be a bridge to other wireless and/or wired media. The IEEE 802.1D/1Q standards, however, require "anti-reflection" in ports making up the bridge. A packet sent out an anti-reflection port does not arrive back at that port. However, a non-AP station in an 802.11 wireless BSS cannot satisfy this requirement for anti-reflection.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus, comprising a first interface, a second interface coupled with an access point to a distribution network, and a controller that sends and receives data via the first and second interfaces. The controller receives a frame via the second interface. The controller determines whether the frame is a distributed-via-mirroring frame based on data contained within a predefined header of the frame. The controller determines whether the frame has an address associated with the apparatus in a predefined field of the predefined header of the frame responsive to determining the frame is a distributed-via-mirroring frame. The controller discards the frame responsive to determining if the frame has the address associated with the apparatus in the predefined field of predefined the header of the frame.

In accordance with an example embodiment, there is disclosed herein an apparatus comprising a first interface coupled with a distribution network. a second interface coupled with a wireless media, and a controller that sends and receives data via the first and second interfaces. The controller receives a frame via the second interface addressed to an original destination. The controller sends a first copy of the frame addressed to a special predefined address on the second interface and sends a second copy of the frame addressed to the original destination on the second interface.

In accordance with an example embodiment, there is disclosed herein a method, comprising receiving a frame from a source by a first bridge, wherein the first bridge does not reflect frames. The first bridge adds a predefined encapsulation header to the frame. The first bridge forwards the encapsulated frame to a second bridge, wherein the second bridge distributes-via-mirroring frames on the same interface on which the frame was received. The second bridge sends a first copy of the frame on the same interface that the frame was received, addressed to a special predefined address for bridges that do not reflect frames. The second bridge sends a second copy of the frame on the same media on which the frame was received addressed to the original destination address by the second bridge.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, packet encapsulation is employed to facilitate bridging between bridges that do not reflect frames (such as 802.1 compatible bridges) and bridges that do reflect frames (such as existing 802.11 compatible bridges). Packets from a wireless access point to its associated non-AP STAs may be sent twice, once with a predefined multicast address for processing by bridges, and once with the original destination address. In particular embodiments, additional mechanisms may be employed to minimize the circumstances where packets are duplicated.

For example, in a wireless network employing an access point (AP) and a wireless bridge (or bridge) Aggregated Media Access Control (MAC) Service Data Unit (A-MSDU) encapsulation is employed to add an anti-reflection property to an 802.11 compatible network. The behavior of the bridge and AP are modified.

For example, when a bridge receives a groupcast frame (in 802.11 unknown unicast frames are not distributed-via-mirroring in an 802.11 network so they are not changed), the bridge encapsulates the frame with an A-MSDU header. Address 2 of the A-MSDU header is replaced with the transmitter address (TA), which is not necessarily the same as the source address (SA). Address 3 of the A-MSDU header is set to a special address, for example a well-known formerly reserved multicast address known as "ForBridges" can be employed. The encapsulated frame is sent to the AP.

The AP distributes-via-mirroring the groupcast frame twice. The first time the distributed-via-mirroring frame is distributed-via-mirroring normally, and may use MSDU or A-MSDU according to 802.11n. The second time the frame is distributed-via-mirroring with Address 1 of the A-MSDU header set to "ForBridges," Address 2 with the address of the AP, and Address 3 contains the address of the bridge that forwarded the frame to the AP.

When the bridge receives distributed-via-mirroring frames from an AP, it checks the addresses in Address 1 and Address 3. If Address 1 Is not "ForBridges" then the bridge discards (or ignores) the frame. If the address in Address 1 is "ForBridges" and in Address 3 is the bridge's address (or an address associated with the bridge), the bridge discards the frame. If the address in Address 1 is "ForBridges" and the address in Address 3 is not the bridge's address, the bridge passes the frame through.

Figure 1:
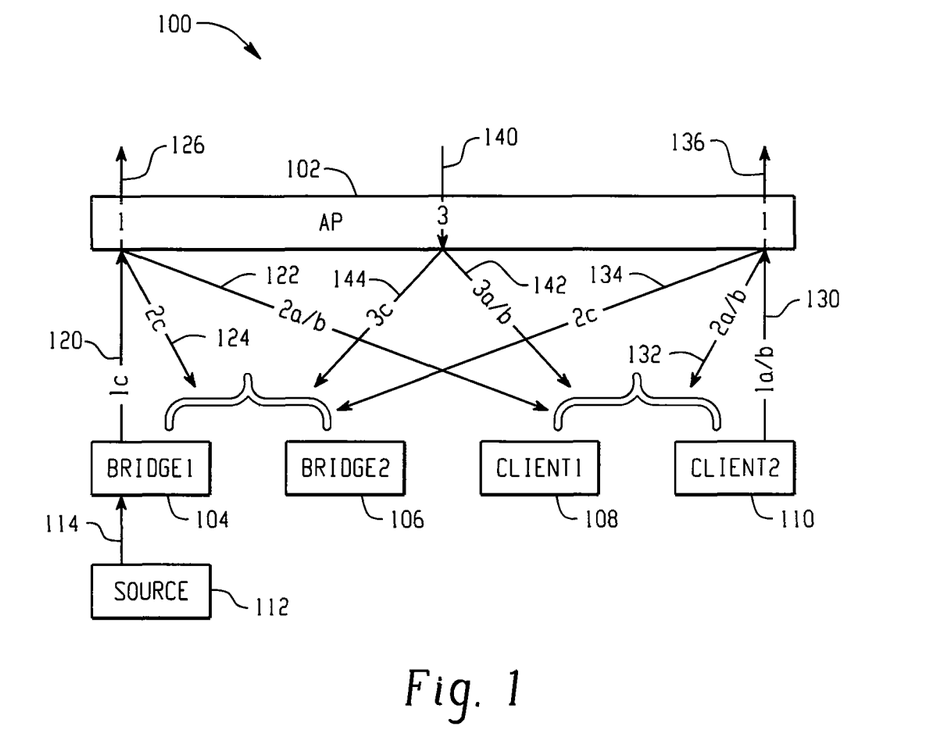
FIG. 1 illustrates an example of a network comprising a modified 802.11 AP and bridges that do not reflect frames at the 802.1 layer via a modified 802.11 distribution mechanism that selectively duplicates all groupcast frames.

Referring to FIG. 1, there is illustrated an example network 100 that contains an access point (AP), which functions as a bridge that communicates with bridges (for example wireless bridges) Bridge1 104 and Bridge2 106, as well as wireless clients Client1 108 and Client2 110. As those skilled in the art can readily appreciate, the number of access points (APs), bridges, clients, and source were selected merely for ease of illustration and that the principles described herein are applicable to networks containing any physically realizable number of APs, bridges, clients, and/or sources or any combination of APs, bridges, clients, and sources.

In the illustrated example, Source (for example a wireless client) 112 sends a frame as illustrated by 114 to Bridge1 104. The frame from source 112 may be any suitable format/protocol.

Bridge1 104 receives the frame from source 114. Bridge1 104 encapsulates the frame with a predefined encapsulation header. In an example embodiment, the predefined encapsulation header is an Aggregate Media Access Control (MAC) Service Data Unit (A-MSDU) header. An example of a frame with an A-MSDU header is provided in frame 202 of FIG. 2. Frames 202, 204, 206 in FIG. 2 comprise a first address (receiver address or destination address "RA") 210, a second address (transmitter address "TA" or the address of the device sending the frame) 212, a third address field 214, and a field 216. Other fields may be present. Address fields 210, 212, and 214 and field 216 comprise the encapsulation header added to the original frame sent by source 112. The original frame in this example may be an aggregate 220 comprising at least one MSDU. At least one MSDU in the aggregate comprises an original destination address 222, Original Source address 224, a Length/Type field 226 and data (or payload) 228.

Figure 2:
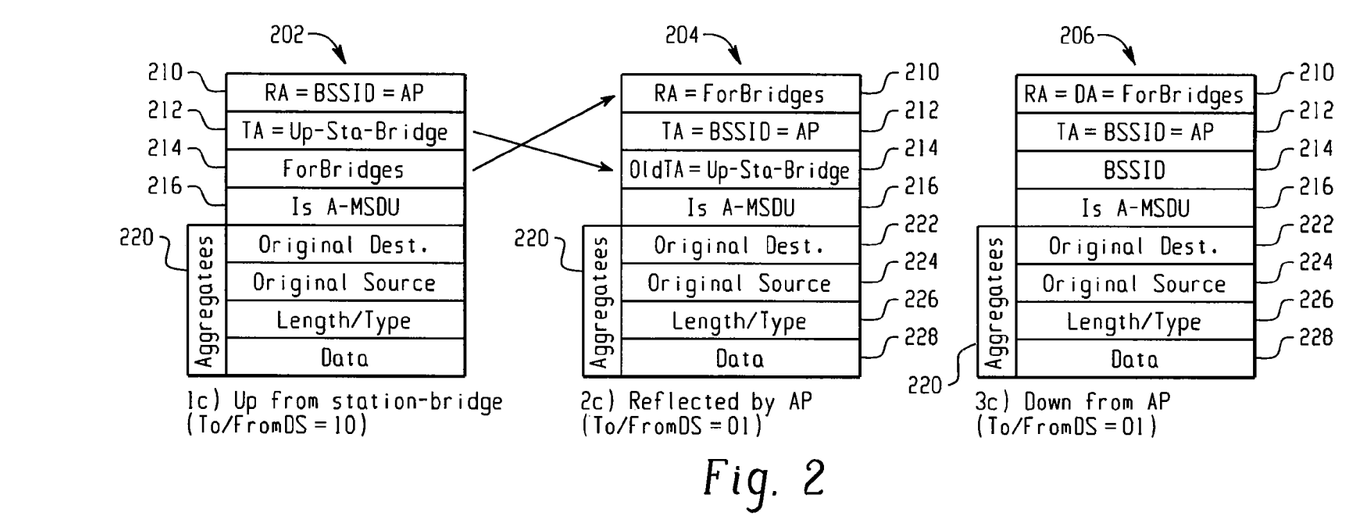
FIG. 2 illustrates an example sequence of formats of frames employing an encapsulation header for directing distributed-via-mirroring frames to bridges.

Bridge1 104 addresses the frame to access point (AP) 102 by setting the address in field 210 to AP 102's address (or basic service set identifier or "BSSID"). The address in field 212 is the transmitter address of Bridge1 104. The address in field 214 is set to a special predefined address, which in this example is "ForBridges" but can be any predefined address. Field 216 contains data indicating that frame 202 is an A-MSDU frame.

In an example embodiment, frame 202 is an 802.11 compatible frame (e.g., 802.11n or ".11n"). In this example the To Distribution System (ToDS)/FromDS or To/From DS is set to 10 indicating the frame is being sent to the distribution system.

The encapsulated frame is sent from Bridge1 104 to AP 102 as represented by 120. In this example, the encapsulated frame is formatted like frame 202 in FIG. 2.

AP 102 distributes-via-mirroring the encapsulated frame twice. The frame is sent once addressed to the original (e.g. multicast) destination address which will be processed by non-bridging wireless clients, for example Client1 108 and Client2 110, as represented by 122 and once to a special, predefined address as illustrated by 124 which will be processed by bridging devices Bridge1 104 and Bridge2 106.

Figure 3:
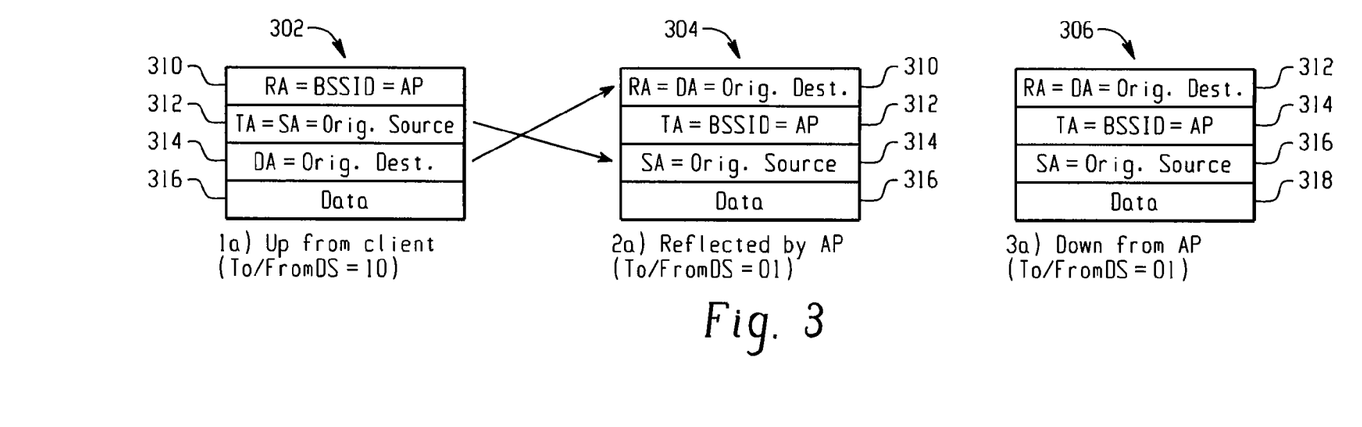
FIG. 3 illustrates an example sequence of formats of frames that are distributed-via-mirroring by an access point without an encapsulation header.
Figure 4:
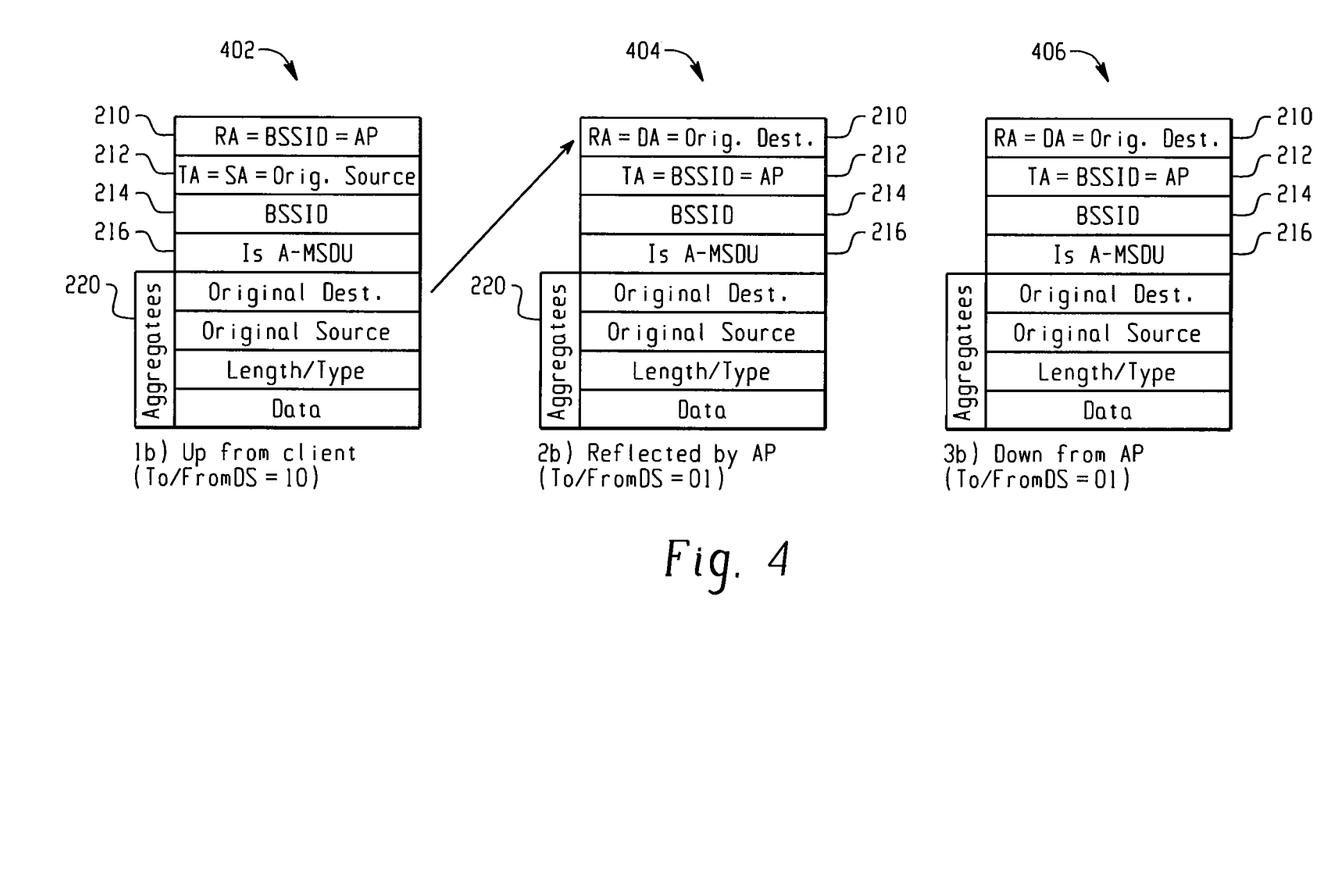
FIG. 4 illustrates an example sequence of formats of frames that are distributed-via-mirroring by an access point addressed to the original destination address.

The frame that is sent addressed to the original destination address may be formatted as illustrated by frame 304 in FIG. 3 or frame 404 in FIG. 4. For example, for a frame formatted similar to frame 304 in FIG. 3, the first Address 310 contains the original destination address, the second Address 312, contains the transmission address (TA) or BSSID of the AP sending the frame, the third Address 314 contains the source address (SA) of the original source address. Frame 304 further comprises data 316. If the frame is formatted similar to frame 404 in FIG. 4, Address 210 contains the original destination address, address 212 the address (either TA or BSSID) of the AP sending the frame, address 214 the BSSID of the AP, and field 216 contains data that indicates the frame is an A-MSDU frame.

In an example embodiment, in addition to the two frames that are distributed-via-mirroring on the wireless media, AP 102 routes another copy of the frame towards the distribution network, or Distribution System "DS", (not shown) represented by 126 (in this example the DS excludes intra-BSS distribution). AP 102 may be directly coupled with the DS or may be indirectly coupled with the DS via a switch (not shown) or other hardware. In the illustrated examples, the distributed-via-mirroring frames represented by 122, 124 are sent on the same interface coupled to a first media (e.g. wireless media) that the frame was received on, where the frame represented by 126 is forwarded to the distribution network, for example via an Ethernet port in a wired connection or via a mesh backhaul in a mesh network.

It should be noted that in the preceding example, the distributed-via-mirroring frames represented by 122 and 124 are received by all wireless devices, e.g. Bridge1, 104, Bridge2 106, Client1 108 and Client2 110. Bridge1 104 and Bridge2 106 ignore the frame represented by 122 because it is not addressed to the predefined (e.g. "ForBridges") address, and Client1 108 and Client2 110 ignore the frame represented by 124 because they do not recognize the destination address of the frame. Bridge1 104 recognizes the predefined address in the frame represented by 124 but because Address 214 of the frame represented by frame 204 is an address associated with Bridge1 104, Bridge1 104 discards the frame. When Bridge2 106 receives the frame represented by 124, because the address in field 214 does not match any transmitter addresses belonging to Bridge2 106, Bridge2 106 forwards the frame.

In an example embodiment, Client2 110 sends a frame, represented by 130 to AP 102. In an example embodiment, the frame represented by 130 is formatted like frame 302 in FIG. 3. In this example embodiment, address 310 is an address associated with AP 102 (for example the BSSID), address 312 is an address associated with the original source, which in this example is client 110, address 314 is the original destination address (for example a multicast or groupcast address), and field 316 comprises data. In another example embodiment, the frame represented by 130 is formatted like frame 402 in FIG. 4. In this example embodiment, the frame is encapsulated, e.g. with an A-MSDU encapsulation header, and address 210 is set to an address associated with AP 102 (such as the BSSID), address 212 with the transmitter address (TA) of the original source which in this example is Client2 110, address 214 has the BSSID, and field 216 indicates the encapsulation header is an A-MSDU header. The original frame is contained within aggregate 220.

In an example embodiment, AP 102, distributes-via-mirroring frames received from wireless clients, such as Client2 110 twice, represented by 132 and 134. In an example embodiment, the frame sent by Client2 110 is formatted similar to an 802.11 frame as illustrated by frame 302 in FIG. 3. In an example embodiment, the distributed-via-mirroring frame represented by 132 is formatted similar to frame 304 in FIG. 3. In the example illustrated in FIG. 3, the original destination address 314 in frame 302 is moved to address 310 in frame 304 distributed-via-mirroring by AP 102. The original source address (SA) in address 312 of frame 302 is address 314 in frame 304. In another example embodiment, a frame formatted like frame 302 is received by AP 102, and the distributed-via-mirroring frame represented by 132 is encapsulated resulting in a frame similar to frame 404 in FIG. 4. In frame 404, the original destination is put in address 210 in frame 404. An address associated with AP 102, such as a TA or BSSID, is inserted into address 212, the BSSID is inserted into address 214, a data indicating the encapsulation header is an A-MSDU (for this example) is inserted into field 216. Frame 302 is contained in aggregate 220.

In an example embodiment, the frame represented by 130 that AP 102 receives from Client2 110 is formatted similar to frame 402 in FIG. 4. As illustrated in FIG. 4, AP 102 inserts the original destination address into address 210 of the distributed-via-mirroring frame (see e.g., frame 404).

In an example embodiment, the frame represented by 134 distributed-via-mirroring by AP 102 is formatted similar to frame 204 in FIG. 2. A special address (for example "ForBridges") is inserted into Address 210 by AP 102.

From the foregoing, as the frame represented by 132 is addressed to the original destination address (e.g., a multicast or groupcast message), the frame represented by 132 is ignored by bridges 104, 106. Client1 108 receives the frame. Client2 110 discards the frame upon determining an address in the frame (for example address 314 if the frame is formatted like frame 304 in FIG. 3 or an original source address in aggregate 220 or an address in address 214 if the frame is formatted like frame 404 in FIG. 4) is an address that is associated with Client2 110—in other words Client2 110 discards a frame if Client2 110 originally sent the frame. The frame represented by 134 is ignored by clients 108, 110 because they do not recognize the predefined address in address 210 (FIG. 2); however, bridges 104, 106 recognize the predefined address and forward the frame.

In an example embodiment, in addition to distributing-via-mirroring, the frame represented by 130 from Client 2 110 twice on the wireless media, AP 102 also forwards the frame towards the distribution system as represented by 136. In particular embodiments, if the frame is encapsulated, the encapsulation header is removed before forwarding.

In an example embodiment, when a frame is received from the distribution system, represented by 140, by AP 102, the frame is forwarded twice on the wireless media as represented by 142 and 144. The frame represented by 142 may be formatted similar to frame 306 in FIG. 3 or frame 406 in FIG. 4. The destination address of the frame is the original destination address, thus clients 108, 110 will process the frames while bridges 104, 106 will ignore the frame because it is not addressed to the special predefined address.

The frame represented by 144 can be formatted similar to frame 206 in FIG. 2. As illustrated in FIG. 2, address 210, the destination address, is set to a special predefined address (which in this example is "ForBridges"). Because this frame has a predefined destination address for bridges, bridges 104, 106 will forward the frame; however, clients 108, 110 will not recognize the address and thus discard the frame.

In an example embodiment, AP 102 monitors multicast group memberships to aid in determining whether packets should be duplicated. AP 102 avoids duplicating packets for clients/segments without sinks.

Figure 5:
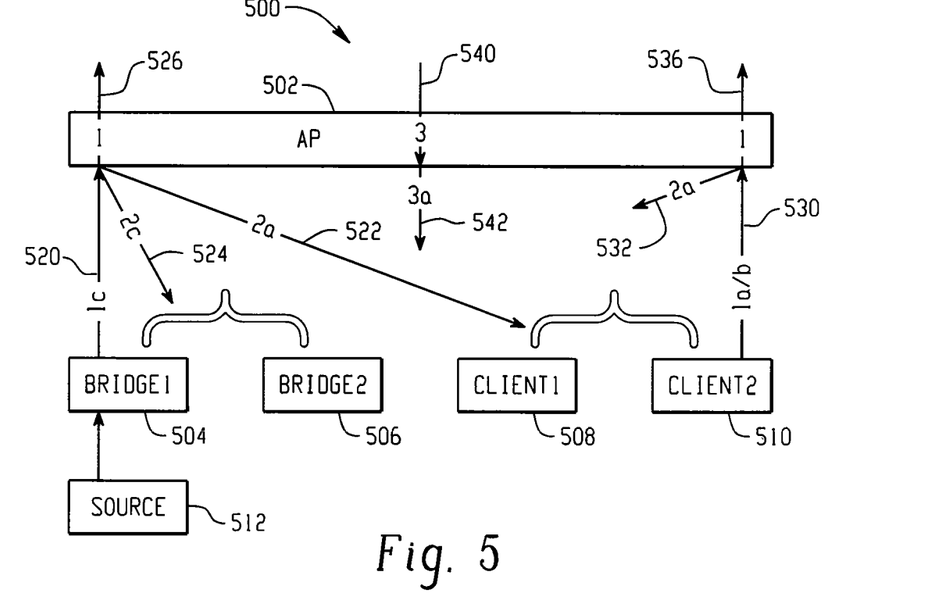
FIG. 5 illustrates an example network comprising an access point and wireless bridges where the access point distributes-via-mirroring only the frames that are received from the wireless bridges.

FIG. 5 illustrates an example of how to reduce the amount of duplicated frames using A-MSDU to signal frame processing. The example contains a network 500 comprising an access 502 point and wireless bridges 504, 506 where access point 102 twice distributes-via-mirroring frames received from wireless bridges 504, 506 using 204 and 404. Frames from clients 508, 510 are distributed-via-mirroring using 304 just once.

For example if all clients are configured to process the encapsulation header (such as 802.11n clients), all frames received from clients, for example the frame represented by 530, distributed-via-mirroring by AP 502, are formatted similar to frame 304 in FIG. 3, and frames received by AP 502 from the distribution system (not shown), represented by 540, are formatted similar to frame 306 illustrated in FIG. 3.

For example, if the frame represented by 530 is formatted similar to frame 302, AP 102 inserts the original destination address from 314 of frame 302 into address 310 of frame 304, and inserts the original source address (e.g., TA or SA) from address 312 of frame 302 into address 314 of frame 304 before sending. If the frame was formatted similar to frame 402, the encapsulation header is removed before transmitting the frame by AP 502. The frame is sent once as illustrated by 532.

In an example embodiment, frames received by AP 502 from the distribution system (not shown), represented by 540, are transmitted on the wireless media, as represented by 542, formatted similar to frame 306 illustrated in FIG. 3. In this case, address 316 is the original destination address, address 314 is an address (e.g., BSSID or TA) of AP 502, and address 316 has the address (e.g., SA) of the original source.

Frames sent by source 512 and forwarded by wireless bridge 504 are encapsulated and formatted similar to frame 202 in FIG. 2. In this example, the frame represented by 520 is encapsulated and formatted similar to frame 202 in FIG. 2, where address 210 is an address (e.g. BSSID or RA) associated with AP 502, address 212 is an address associated with the bridge sending the frame (Bridge 1 504 in this example), address 214 is a predefined address ("ForBridges" in this example) and address 216 indicates the frame is encapsulated using A-MSDU. AP 502, upon receiving the frame, distributes-via-mirroring the frame twice. One copy of the distributed-via-mirroring frame is formatted similar to frame 404 in FIG. 4, with address 210 set to the original destination address (the destination address when the frame was sent by source 512). Another copy of the distributed-via-mirroring frame is formatted similar to frame 204 in FIG. 2, where address 210 is a predefined address for bridges, "ForBridges" in this example, and address 214 is the address of the bridge that sent the frame to AP 502, Bridge1 504 in this example.

Bridges 504, 506 will ignore the frame represented by 522 because it is A-MSDU formatted but not addressed to any of the predefined addresses for bridges. Clients 508, 510 will not ignore the frame.

Clients 508, 510 will ignore the frame represented by 524 because it is addressed to the predefined address. Bridges 504, 506 will not ignore the frame. Bridge1 504 will discard the frame because address 214 contains the address for Bridge1 504. Bridge2 506 will process the frame since address 214 does not contain the address for Bridge2 506. Frames from bridges 504, 506 and clients 508, 510 may also be forwarded to the distribution system (not shown) as illustrated by 526, 536 respectively.

Figure 6:
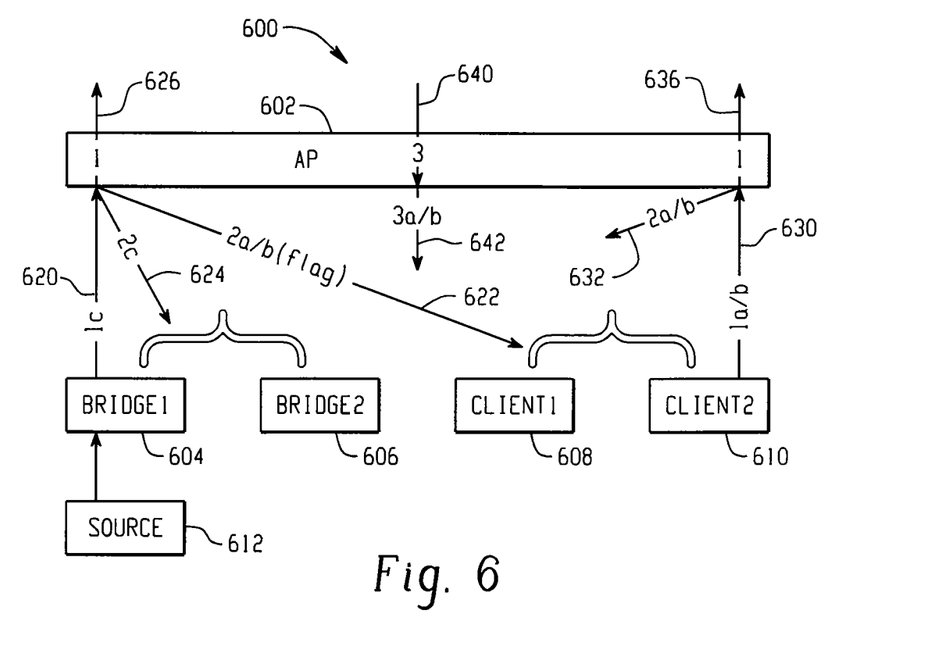
FIG. 6 illustrates an example of a network comprising an access point and wireless bridges where the access point sets a flag within a frame to instruct bridges to whether to ignore the frame.

FIG. 6 illustrates an example network 600 comprising an access point 602 and wireless bridges 604, 606 where access point 606 sets a flag (such as a predefined otherwise unused bit) within a frame to instruct bridges 604, 606 whether to ignore the frame. In this example embodiment, frames from wireless bridges (e.g., wireless bridges 604, 606) are distributed-via-mirroring twice by AP 602, whereas frames from other sources such as clients 508, 510 are distributed-via-mirroring once and the distribution system (not shown) are distributed once.

For example, when frame is sent from source 612 to Bridge1 604, Bridge1 encapsulated the frame similar to frame 202 in FIG. 2, where address 210 is the address of AP 602, address 212 is an address (e.g. TA) associated with Bridge1 604, and address 214 is a predefined address ("ForBridges" in this example), and field 216 indicates A-MSDU encapsulation was employed for this example. AP 602 distributes-via-mirroring the frame received from Bridge1 604 twice. One copy of the frame transmitted on the wireless media, represented by 622, is distributed-via-mirroring formatted similar to either frame 304 in FIG. 3 or frame 404 in FIG. 4 where the original destination address is the address in address 310 and 410 respectively with a flag set to indicate to bridges 604, 606 that they, should ignore the frame. Clients 608, 610 will not ignore the frame.

A second copy of the frame transmitted on the wireless media, represented by 624, is formatted similar to frame 204 in FIG. 2 where address 210 contains a predefined address to indicate only bridges should forward the frame ("ForBridges" in this example) and address 214 contains the address of the bridge sending the frame to AP 602, in this example Bridge1 504. Because the frame is addressed to the special address, clients 608, 610 will ignore the frame. Bridges 604, 606 will not ignore the frame since it is addressed to the special address; however, Bridge1 604 will discard the frame upon determining that address 214 contains the address for Bridge1 604. Bridge2 606 will forward the frame because address 214 does not contain the address for Bridge1 606.

Frames received from clients 508, 510 may be formatted like frame 302 in FIG. 3 and/or frame 402 in FIG. 4. The distributed-via-mirroring frame, represented by 632 is transmitted in the format understood by all devices in the BSS. For example, if 630 and 632 are formatted as indicated in FIG. 3, address 310 of the distributed-via-mirroring frame is address 314 (the original destination address) of frame 302 and address 314 is address 312 of frame 302 (the SA of the client sending the frame, which is Client2 610 in this example). Because the flag is not set, bridges 604, 606 will not ignore the frame and Client1 608 will not ignore the frame. Client2 610 will discard the frame because address 314 contains Client2 610's address.

Frames received from the distribution system (not shown) represented by 640 may forwarded onto the wireless media formatted like frame 306 in FIG. 3 or frame 406 in FIG. 4 where address 312 and 412 respectively contain the original destination address, and the flag is not set. Bridges 604, 606 and clients 608, 610 will not ignore the frame. Frames from bridges 604, 606 and clients 608, 610 may also be forwarded to the distribution system (not shown) as illustrated by 626, 636 respectively.

Figure 7:
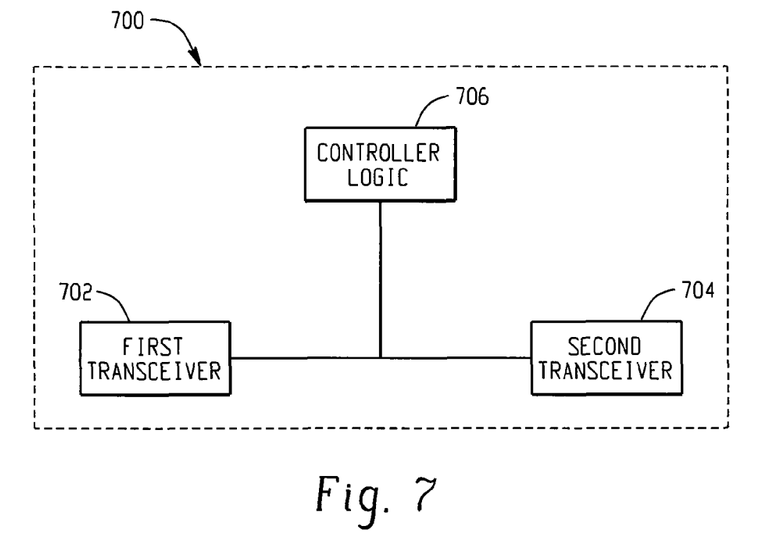
FIG. 7 illustrates an example apparatus that may be employed to implement a bridge in accordance with an example embodiment.

FIG. 7 illustrates an example of an apparatus 700 that may be employed to implement a bridge in accordance with an example embodiment. Apparatus 700 is suitable to implement the functionality of a reflecting bridge (such as an 802.11 AP) such as AP 102 (FIG. 1), AP 502 (FIG. 5), and/or AP 602 (FIG. 6), and a non-reflecting bridge (for example a wireless 802.1-compatible bridge) such as bridges 104, 106 (FIG. 1), bridges 504, 506 (FIG. 5) and/or bridges 604, 606 (FIG. 6).

Apparatus 700 comprises a first transceiver 702 and a second transceiver 704. First transceiver 702 and second transceiver 704 may be wireless or wired transceivers. Controller logic 706 is coupled with first transceiver 702, and second transceiver 704 and operable to send and receive data via first transceiver 702 and second transceiver 706. Controller logic 706 implements the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Figure 8:
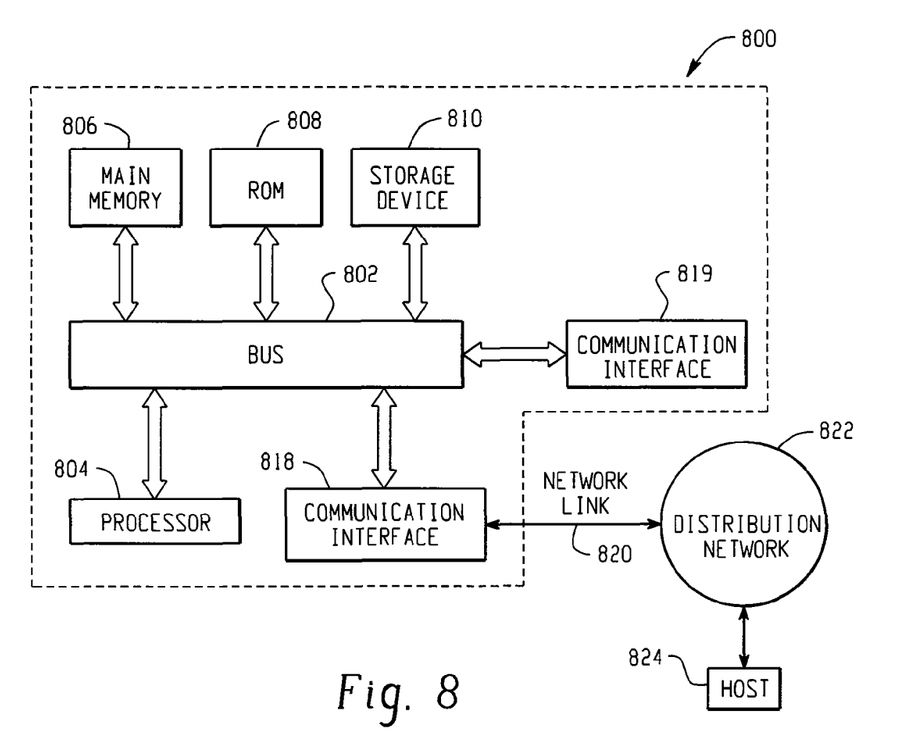
FIG. 8 illustrates an example computer system upon which an example embodiment may be implemented.

FIG. 8 illustrates an example of a computer system 800 upon which an example embodiment may be implemented. Computer system 800 is suitable for implementing the functionality of controller logic 706 (FIG. 7), a reflecting bridge (such as an 802.11 AP) such as AP 102 (FIG. 1), AP 502 (FIG. 5), and/or AP 602 (FIG. 6), and a non-reflecting bridge (for example an 802.1 compatible wireless bridge) such as bridges 104, 106 (FIG. 1), bridges 504, 506 (FIG. 5) and/or bridges 604, 606 (FIG. 6).

Computer system 800 includes a bus 802 or other communication mechanism for communicating information and a processor 804 coupled with bus 802 for processing information. Computer system 800 also includes a main memory 806, such as random access memory (RAM) or other dynamic storage device coupled to bus 802 for storing information and instructions to be executed by processor 804. Main memory 806 also may be used for storing a temporary variable or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

An aspect of the example embodiment is related to the use of computer system 800 for using encapsulation to enable bridging between non-reflecting (e.g. 802.1) bridges and reflecting (e.g. 802.1-compatible 802.11) bridges. According to an example embodiment, using encapsulation to enable 802.1 bridging across 802.11 links is provided by computer system 800 in response to processor 804 executing one or more sequences of one or more instructions contained in main memory 806. Such instructions may be read into main memory 806 from another computer-readable medium, such as storage device 810. Execution of the sequence of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 804 for execution. Such a medium may take many forms, including but not limited to non-volatile media, and volatile media. Non-volatile media include for example optical or magnetic disks, such as storage device 810. Volatile media include dynamic memory such as main memory 806. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 804 for execution. For example, the instructions may initially be borne on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806 from which processor 804 retrieves and executes the instructions. The instructions received by main memory 806 may optionally be stored on storage device 810 either before or after execution by processor 804.

Computer system 800 also includes communication interfaces 818, 819 coupled to bus 802. Communication interfaces 818, 819 provide a two-way data communication coupling computer system 800 to network links. One communication interface, communication interface 818 in this example, can be coupled, directly or indirectly, through a network link 820 to a distribution network 822 that can enable computer system 800 to communicate to a host 824. Communication interfaces 818, 819 may suitably communicate with either wired and/or wireless devices. For example, an AP may have a wired interface (e.g. communication interface 818) coupled with the distribution system and a wireless interface (e.g. communication interface 819) to communicate with wireless clients. As another example, either interfaces may be either wired or wireless, for example of the AP is a mesh AP both interfaces may be wireless.

In view of the foregoing structural and functional features described above, a methodologies in accordance with example embodiments will be better appreciated with reference to FIGS. 9-16. While, for purposes of simplicity of explanation, the methodologies of FIGS. 9-16 are shown and described as executing serially, it is to be understood and appreciated that the example embodiment are not limited by the illustrated orders, as some aspects could occur in different orders and/or concurrently with other aspects from that shown and described herein. Moreover, not all illustrated features may be required to implement one or more of the methodologies described herein. The methodologies described herein are suitably adapted to be implemented in hardware, software, or a combination thereof.

Figure 9:
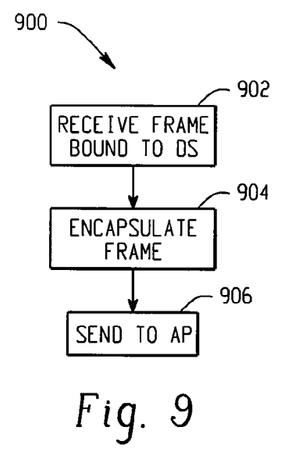
FIG. 9 illustrates an example methodology where a wireless bridge encapsulates a frame being forwarded to the distribution system before forwarding.

FIG. 9 illustrates an example methodology 900 where a wireless bridge encapsulates a frame being forwarded to the distribution system before forwarding. Methodology 900 may be performed by bridges 104, 106 (FIG. 1), 504, 506 (FIG. 2), 604, 606 (FIG. 6), control logic 706 (FIG. 7), and/or computer system 800 (FIG. 8).

At 902, a frame directed towards the distribution system is received from a source device. In an example embodiment, the frame is a groupcast frame.

At 904, the frame is encapsulated. In an example embodiment, the frame is encapsulated with an A-MSDU header. In an example embodiment, the frame is formatted similar to frame 202 in FIG. 2. The destination address of the encapsulation header is an address associated with an associated AP, such as the AP's Receive Address (RA) or BSSID. The second address of the encapsulation header is the address of the wireless bridge forwarding the frame. A third address of the frame, e.g., address 214 in FIG. 2, is set to a predefined address, which in this example is "ForBridges". The original frame is contained within aggregate 220. The frame is then forwarded to the AP as illustrated by 906.

Figure 10:
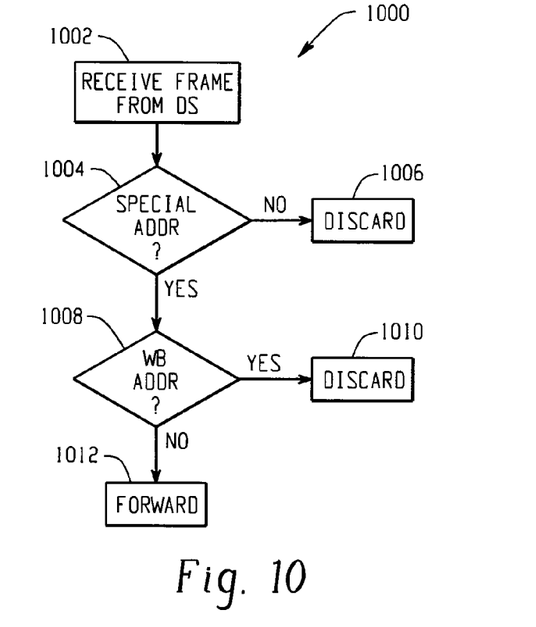
FIG. 10 illustrates an example methodology for a wireless bridge to determine whether to ignore a frame received from an access point.

FIG. 10 illustrates an example of a methodology 1000 for a wireless bridge to determine whether to ignore a frame received from an access point. For example, methodology 1000 may be implemented by wireless bridges 104, 106 in FIG. 1, control logic 706 in FIG. 7 and/or computer system 800 in FIG. 8.

At 1002, a frame is received from the distribution system. For example, bridges 104, 106 (FIG. 1) may receive a frame from AP 102. In an example embodiment, the frame is formatted similar to frame 204 in FIG. 2.

At 1004, the wireless bridge determines whether the frame is addressed to a special predefined address, such as "For-Bridges" but can be any suitable predefined address. If at 1004 a determination is made that the frame is not addressed to the predefined address (NO), the frame is discarded as indicated at 1006.

If, at 1004, the wireless bridge determines the frame does contain the predefined address (YES), at 1006, the frame is examined to determine whether the frame contains an address belonging to the wireless bridge. In an example embodiment where the frame is formatted similar to frame 204 in FIG. 2, address 214 is inspected. If the frame contains an address belonging to the wireless bridge receiving the frame (YES), the frame is discarded as illustrated at 1010.

If, at 1008, a determination is made that the frame does not have an address corresponding to the wireless bridge receiving the frame (NO), the frame is accepted at 1012. In an example embodiment, the frame is forwarded away from the distribution system. In particular embodiments, the encapsulation header (for example addresses 210, 212, 214, and 216) is removed before forwarding.

Figure 11:
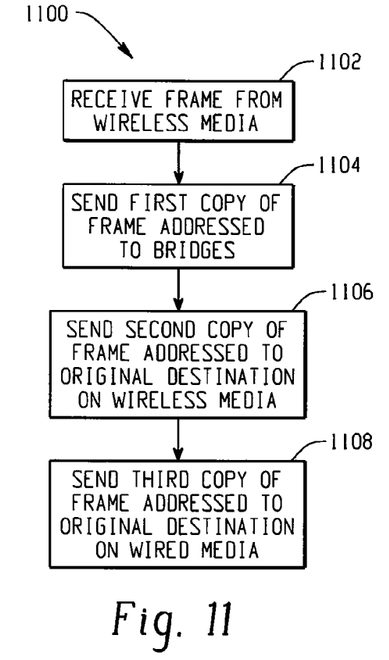
FIG. 11 illustrates an example methodology performed by an access point receiving a frame from the wireless media.

FIG. 11 illustrates an example of a methodology 1100 performed by an access point receiving a frame from the wireless media. For example, access point 102 (FIG. 1) may perform methodology 1100 upon receiving a frame from one of bridges 104, 106 and/or clients 108, 110 (FIG. 1). AP 502 may perform methodology upon receiving a frame from one of bridges 504, 506. Methodology 1100 may be suitably implemented by control logic 706 (FIG. 7) and/or computer system 800 (FIG. 8).

At 1102, a frame is received via the wireless media. In particular embodiments, the frame is sent as being directed towards the distribution system (e.g., To/FromDS=10). Frames received from a wireless bridge may be formatted similar to frame 202 in FIG. 2. Frames received from wireless clients may be formatted similar to frame 302 in FIG. 3 and/or frame 402 in FIG. 4.

At 1104, a first copy of the received frame is sent (distributed-via-mirroring) on the wireless media addressed to a special, predefined address for bridges. In an example embodiment, a special, predefined address, such as "ForBridges" is employed.

In an example embodiment, a frame formatted similar to frame 202 in FIG. 2 is received by the AP, and the distributed-via-mirroring frame is similar to frame 204 in FIG. 2. As illustrated in FIG. 2, the special, predefined address ("ForBridges" in this example) is moved from address 214 in frame 202 to address 210 in frame 204, and the address of the wireless bridge that sent the frame to the AP is moved from address 212 in frame 202 to address 214 of frame 204.

In an example embodiment, the received frame is from a wireless station that is formatted similar to frame 302 in FIG. 3 or frame 402 in FIG. 4, the distributed-via-mirroring frame is formatted similar to frame 204 in FIG. 2. If the received frame is formatted similar to frame 302, the frame is encapsulated and addressed to the predefined address ("ForBridges" in this example). Address 212 would be an address affiliated with the AP, such as its MAC address or the BSSID, and address 214 would contain the address of the wireless bridge sending the frame. If the received frame is formatted similar to frame 402, the distributed-via-mirroring frame is formatted similar to frame 204 in FIG. 2, where address 210 contains the special, predefined destination address, address 212 has an address affiliated with the AP, such as a TA or BSSID, and address 214 would have the address of the original source, which would the address of the wireless bridge sending the frame.

At 1106, a second (distributed-via-mirroring) copy of the frame is sent on the wireless media. This frame is addressed to the original destination address. This copy may be formatted similar to frame 304 in FIG. 3 or frame 404 in FIG. 4. The received frame from a wireless station that is formatted similar to frame 302 in FIG. 3 or frame 402 in FIG. 4 is distributed-via-mirroring frame then formatted similar to frame 304 in FIG. 3 or frame 404 in FIG. 4 according to the capabilities of the non-AP STAs in the BSS. For example, as illustrated in FIG. 3, if the received frame is formatted like frame 302 and the sent frame is formatted like 304, the TA or SA of the original source (the wireless client) in address 312 is moved to address 314 of the distributed-via-mirroring frame, and the original destination address in address 314 of frame 302 is moved to destination address 310 of the distributed-via-mirroring frame.

At 1108, a third copy of the frame is sent on the distribution system. Although the example herein refers to the distribution network as being coupled with the wired media, those skilled in the art should readily appreciate that if the AP is a mesh AP the frame would be forwarded wirelessly to the distribution system. In particular embodiments, the encapsulation header (for example the encapsulation header added by a wireless bridge forwarding the frame) is removed before forwarding towards the distribution system.

Figure 12:
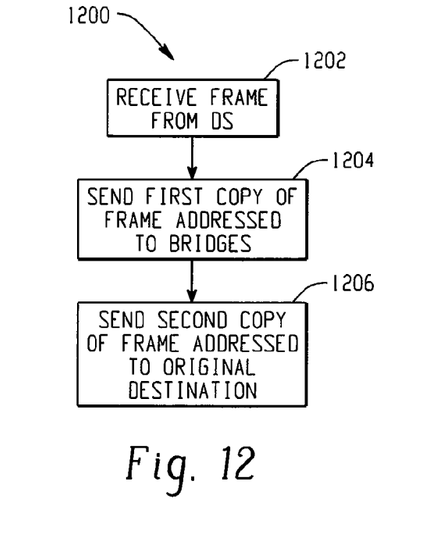
FIG. 12 illustrates an example methodology where an access point sends multiple copies of a frame onto the wireless media that was received from the distribution network.

FIG. 12 illustrates an example methodology 1200 where an access point sends multiple copies of a frame onto the wireless media that was received from the distribution network as illustrated by 1202. For example, access point 102 (FIG. 1) may perform methodology 1100 upon receiving a frame from the distribution system as illustrated by 140. Methodology 1100 may be suitably implemented by control logic 706 (FIG. 7) and/or computer system 800 (FIG. 8).

At 1204, a first copy of the frame is sent on the wireless media addressed to bridges. As described herein, the frame may be addressed to a special, predefined address (for example "ForBridges"). This frame may be formatted similar to frame 206 in FIG. 2, where address 210 contains the special, predefined address, address 212 contains an address affiliated with the AP such as a TA or BSSID.

At 1206, a second copy of the frame is sent on the wireless media addressed to the original destination address. This frame may be formatted similar to frame 306 in FIG. 3 where address 312 contains the original destination address or similar to frame 406 in FIG. 4.

Figure 13:
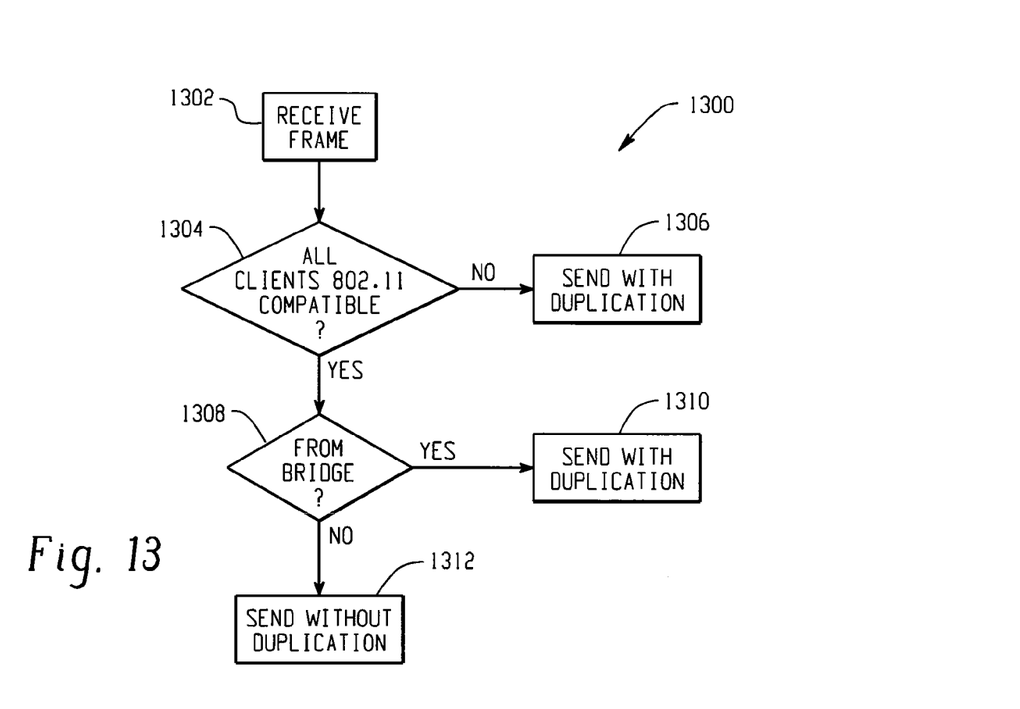
FIG. 13 illustrates an example methodology for an access point to determine whether to duplicate a frame.

FIG. 13 illustrates an example methodology 1300 for an access point to determine whether to duplicate a frame. Methodology 1300 may be implemented by AP 502 in FIG. 5, which may suitably comprise control logic 706 in FIG. 7 and/or computer system 800 in FIG. 8. In an example embodiment all frames received from the distribution network and/or wireless clients can be sent without duplication. In this embodiment, wireless bridges forward all multicast/groupcast frames that are not addressed to a special predefined address. Thus, only frames received from wireless bridges are duplicated. Frames formatted similar to frame 302 in FIG. 3 or frame 402 in FIG. 4 are forwarded formatted similar to frame 304 on the wireless media. Frames from the distribution system are formatted like frame 306 in FIG. 3.

At 1302 the frame is received. The frame may be received from a wireless client, a wireless bridge, or from the distribution system.

At 1304, a determination is made whether all the associated wireless clients are 802.11 compatible. If some clients are not 802.11n compatible (NO), the frame duplication is implemented as illustrated at 1306.

If, a 1304, all clients are 802.11n compatible (YES), at 1308 a determination is made whether the frame was received from a wireless bridge. If the frame was received from a wireless bridge, the frame is distributed-via-mirroring twice at 1310. For example, the first time the frame is formatted like frame 202 in FIG. 2, addressed to the original destination address, and the second distributed-via-mirroring frame is formatted similar to frame 204 in FIG. 2, where the destination address is a special address for wireless bridging devices and address 214 contains the address of the wireless bridge that sent the frame to the AP.

If at 1308, the frame was not sent by a wireless bridge (NO), at 1312 the frame is sent on the wireless media without duplication. For example, frames received from wireless clients may be formatted similar to frame 302 in FIG. 2 or 402 in FIG. 4, and frames received from the distribution system may be formatted similar to frame 306 in FIG. 3.

Figure 14:
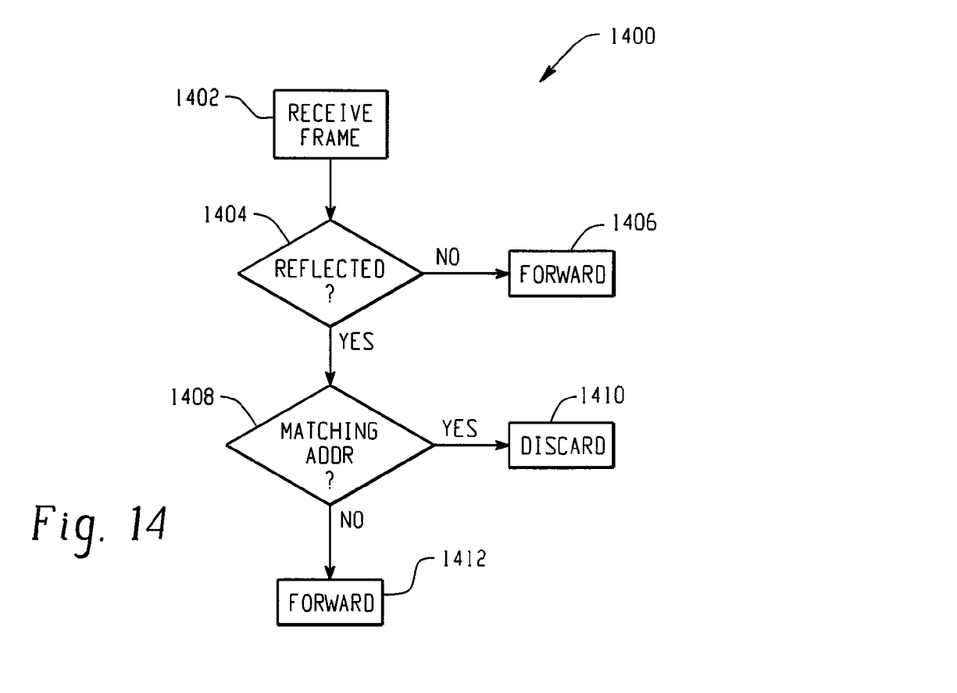
FIG. 14 illustrates an example methodology where a wireless bridge is configured to selectively accept frames of one predefined format, and accept all frame other formats.

FIG. 14 illustrates an example methodology 1400 where a wireless bridge is configured to selectively accept frames of one predefined format, and accept all frame other formats. Methodology 1400 may be implemented by bridges 504, 506 in FIG. 5 which may suitably comprise control logic 706 (FIG. 7) and/or computer system 800 (FIG. 8).

At 1402, a frame is received. The frame may be formatted similar to frame 204, 206 in FIG. 2, frame 304 or 306 in FIG. 3, or frame 404, 406 in FIG. 4.

At 1404, a determination is made whether the frame is a distributed-via-mirroring frame intended for bridges. For example, if the frame is addressed to a special, predefined address such as "ForBridges" it would be considered a distributed-via-mirroring frame intended for bridges. If the frame is not addressed to the special, predefined address, for example is formatted similar to frame 304, 306 (FIG. 3) and/or 404 (FIG. 4) it is not considered a distributed-via-mirroring frame intended for bridges.

If, at 1404, the frame was determined not to be a distributed-via-mirroring frame intended for bridges (NO), at 1406 the frame is forwarded. In particular embodiments, if the frame has an encapsulation header, encapsulation header may be removed.

If, at 1404, the frame was determined to be a distributed-via-mirroring frame intended for bridges (YES), at 1408 a determination is made whether the frame has an address affiliated with the wireless bridge receiving the frame. If the frame contains an address affiliated with the wireless bridge receiving the frame, see for example address 214 in frame 204 of FIG. 2 (YES), the frame is discarded as indicated by 1410. Otherwise, the frame is forwarded as indicated by 1412. In particular embodiments, an encapsulation header is removed from the frame before the frame is forwarded at 412.

Figure 15:
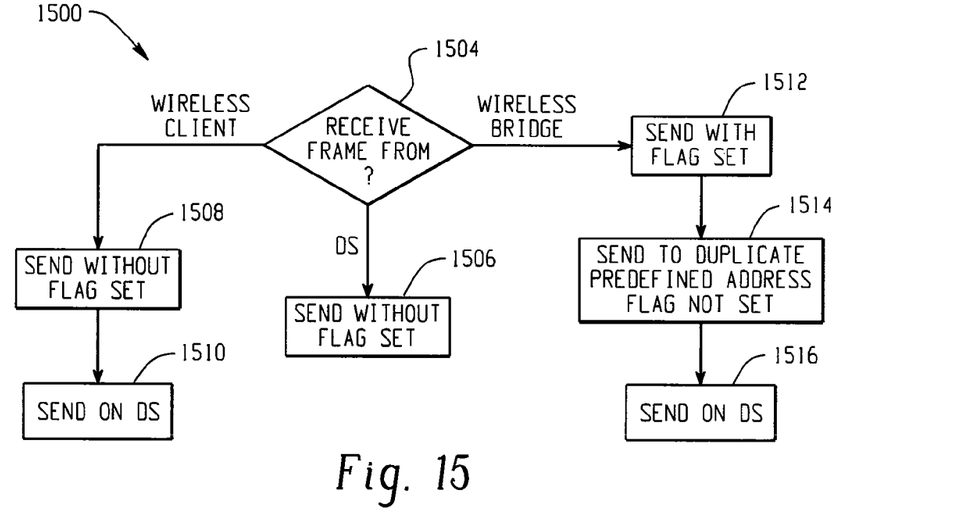
FIG. 15 illustrates an example methodology where an access point determines whether to set a flag in a frame being transmitted.

FIG. 15 illustrates an example methodology 1500 where an access point determines whether to set a flag in a frame being transmitted. Methodology may be implemented by AP 602 in FIG. 6, which may suitably comprise control logic 706 in FIG. 7 and/or computer system 800 in FIG. 8. In this example embodiment, the AP sets the flag to instruct wireless bridges receiving the frame to ignore the frame.

At 1504, a frame is received. The frame is forwarded depending on which interface the frame was received from and/or whether the frame was received from a wireless bridging device or a wireless client.

For example, if, at 1504, the frame was received from the distribution system, the frame is sent once on the wireless media as illustrated at 1506. The frame is addressed to the original destination address and the flag is not set. Since the flag is not set, any bridges receiving the frame, such as bridges 604, 606 in FIG. 6 will forward the frame. The frame may be formatted similar to frame 306 in FIG. 3 or frame 406 in FIG. 4.

If, at 1504, the frame was received from a wireless client, the frame is sent once on the wireless media as illustrated by 1508 and forwarded to the distribution system as illustrated by 1510. The frame received from the wireless client may be formatted similar to frame 302 in FIG. 3 or frame 402 in FIG. 4, and the frame sent (distributed-via-mirroring) on the wireless media may be formatted similar to frame 304 in FIG. 3 or frame 404 in FIG. 4 respectively. The frame is addressed to the original destination address and the flag Is not set. Since the flag Is not set, any bridges receiving the frame, such as bridges 604, 606 in FIG. 6 will forward the frame.

If, at 1504, the frame was received from a wireless bridge, for example one of bridges 604, 606 in FIG. 6, the frame is sent (distributed-via-mirroring) twice on the wireless media as illustrated at 1512 and 1514 and is also forwarded towards the distribution system as illustrated by 1516.

When the frame is sent (distributed-via-mirroring) at 1512, the flag is set and the frame is addressed to the original (multicast) destination address. Because the flag is set, any wireless bridge receiving the frame will ignore (discard) the frame; however, any wireless client receiving the frame will not ignore the frame. The frame may be formatted similar to frame 304 in FIG. 3 or frame 404 in FIG. 4.

When the frame is sent (distributed-via-mirroring) at 1514, the flag is not set, the frame is addressed to a special, predefined multicast address, for example "ForBridges," and the address of the wireless bridge that forwarded the frame to the AP is included in the header. Because the frame is addressed to the predefined address, non-bridging wireless clients will ignore (discard) the frame. Wireless bridges will accept the frame because the frame is addressed to the special, predefined address; however, the wireless bridges will verify whether the header of the address contains an address affiliated with the bridge. For example, the frame may be sent formatted similar to frame 204 in FIG. 2. If a bridge finds its address in address 214, that bridge will discard the frame.

Figure 16:
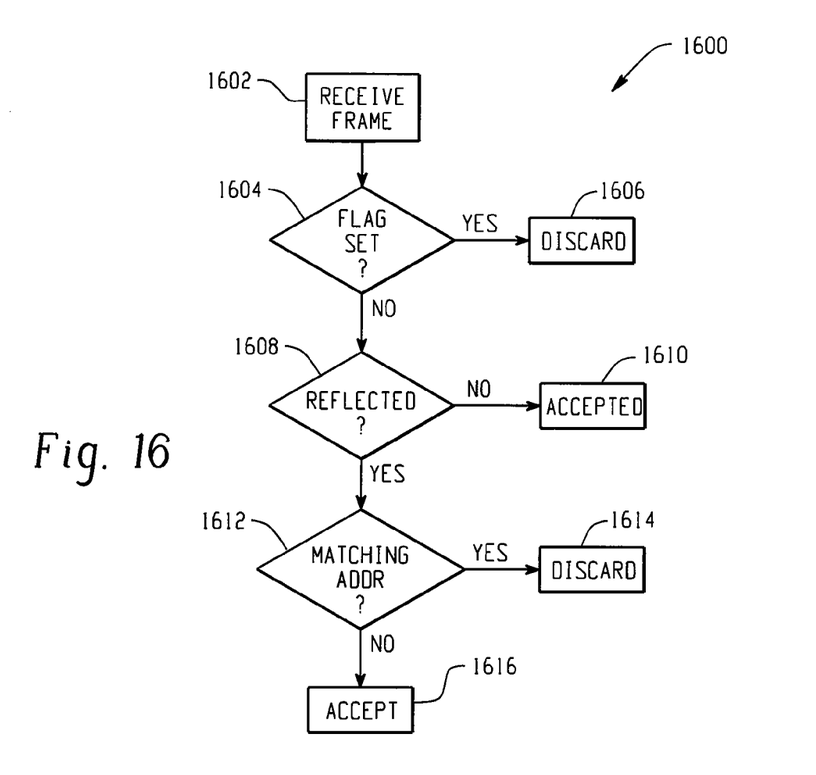
FIG. 16 illustrates an example methodology where a wireless bridge determines whether to accept a frame based on whether a flag is set in a frame and also employs distribution-via-mirroring discarding.

FIG. 16 illustrates an example methodology 1600 where a wireless bridge determines whether to accept a frame based on whether a flag is set in a frame and also employs distribution-via-mirroring discarding. Methodology may be implemented by AP 602 in FIG. 6, which may suitably comprise control logic 706 in FIG. 7 and/or computer system 800 in FIG. 8.

At 1602, the wireless bridge receives a frame from the distribution system, e.g., an AP. The wireless bridge determines whether a predefined flag is set in the frame at 1604. If the bit is set (YES), the frame is discarded (ignored) as illustrated at 1606.

If at 1604, the predefined flag of the frame is not set (NO), at 1608, the wireless bridge determines whether the frame was a distributed-via-mirroring frame intended for bridges. For example, in an example embodiment, if the frame has a special, predefined destination address, such as "ForBridges," the frame is considered a distributed-via-mirroring frame intended for bridges (e.g., a frame that was distributed-via-mirroring from a wireless bridge). If the frame is addressed to any address that is not the special predefined address, such as a groupcast address, see e.g., frame 404 in FIG. 4, the frame was not distributed-via-mirroring from a wireless bridge intended for bridges. If the frame was not distributed-via-mirroring from a wireless frame intended for bridges (NO), the frame is accepted at 1610.

If the wireless bridge determines at 1608 that the frame was distributed-via-mirroring from a wireless bridge intended for bridges (YES), at 1612 the wireless bridge determines whether the frame originated from an address affiliated with the wireless bridge. For example, if the frame is formatted similar to frame 204 in FIG. 2, the wireless bridge looks at address 214 to determine whether the address in that field matches an address for the wireless bridge. If an address in the frame matches an address for the wireless bridge (YES), the frame is discarded at 1614; otherwise, at 1616, the frame is accepted and/or forwarded.

In the preceding example embodiments, a wireless network was employed to illustrate various features. Those skilled in the art should readily appreciate that the principles described herein are not limited to wireless networks but may be employed on any network that has non-reflecting bridging type devices (in the 802.1 sense). For example, a reflecting bridging device and its connected devices can be upgraded to a non-reflecting bridging device and its connected devices in the same was as a reflecting AP and its connected devices can be upgraded to a non-reflecting AP (such as a legacy 802.11 AP 102 in FIG. 1), and its connected devices (such as Bridge1 104 or Bridge2 106 in FIG. 1).

As those skilled in the art can readily appreciate, the preceding example embodiments can be suitably adapted to alternate multicast schemes such as DMS (Directed Multicast Service defined in the 802.11v specification) and MRG (More Reliable Groupcast defined in the 802.11aa). For example, when multicast-to-unicast conversion is used on a stream, bridges ignore the multicast version of the stream, and only accept the unicast version. When MRG uses A-MSDU to hide multicast retries from legacy via A-MSDU to an MRG concealment address, there can be either a third special multicast address (signifying MRG concealment plus ForBridges), or anti-reflection A-MSDU encapsulation (to ForBridges) of MRG A-MSDU encapsulation (to MRG concealment address).

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a first interface;
a second interface configured to communicate with an access point coupled with a distribution network;
a controller that sends and receives data via the first and second interfaces; wherein the controller receives a first frame via the second interface; wherein the controller determines whether the first frame is a distributed-via-mirroring frame intended for bridges based on data contained within a predefined header of the first frame; wherein the controller determines whether the first frame has an address associated with the apparatus in a predefined field of the predefined header of the first frame responsive to determining the first frame is a distributed-via-mirroring frame intended for bridges;
wherein the controller selectively discards the first frame responsive to determining the first frame has the address associated with the apparatus in the predefined field of the predefined header of the first frame;
wherein the controller receives a second frame via the second interface;
wherein the controller determines whether the second frame is a distributed-via-mirroring frame intended for bridges based on data contained within a header of the second frame;
wherein the controller determines whether the second frame has an address associated with the apparatus in a predefined field of the header of the second frame responsive to determining if the second frame was sent by itself and should be discarded; and
wherein the controller selectively forwards the second frame for transmission by the first interface responsive to determining the second frame does not have the address associated with the apparatus in the predefined field of the header of the second frame.

2. The apparatus set forth in claim 1, wherein the controller receives a third frame via the first interface;
wherein the controller adds an encapsulation header to the third frame;
wherein the controller inserts the address associated with the apparatus into a predefined position in the encapsulation header of the third frame; and wherein the controller transmits the third frame via the second interface.

3. The apparatus set forth in claim 2, wherein the encapsulation header is an aggregate media access control service data unit.

4. The apparatus set forth in claim 1, wherein the header is an aggregate media access control service data unit.

5. The apparatus set forth in claim 1, wherein the predefined header is a predefined encapsulation header; and the controller determines the first frame is a distributed-via-mirroring frame by determining whether the predefined encapsulation header is addressed to a predefined destination address, and the predefined encapsulation address contains the address of the apparatus.

6. The apparatus set forth in claim 1, wherein the controller determines whether the frame is a distributed-via-mirroring frame based on checking a predetermined flag within the first frame.

7. An apparatus, comprising:
a first interface configured to communicate with a distribution network; a second interface configured to communicate with a wireless media; a controller that sends and receives data via the first and second interfaces;
wherein the controller receives a frame via the second interface addressed to an original destination;
wherein the controller sends a first copy of the frame addressed to a special predefined address on the second interface; wherein the controller sends a second copy of the frame addressed to the original destination on the second interface; wherein the controller determines whether the frame has a predefined encapsulation header wherein the controller sends a third copy of the frame addressed to the original destination on the first interface; and wherein the controller removes the predefined encapsulation header before sending the third copy of the frame on the first interface.

8. The apparatus set forth in claim 7, wherein the controller sends the first copy of the frame and second copy of the frame responsive to determining the frame has the predefined encapsulation header.

9. The apparatus set forth in claim 7, wherein the controller receives a second frame via the second interface; wherein the controller determines whether the second frame has the predefined encapsulation header; and wherein the controller sends only one copy of the second frame on the second interface responsive to determining the second frame does not have the predefined encapsulation header.

10. The apparatus set forth in claim 7, wherein:
the controller receives a second frame addressed to a second original destination via the first interface;
the controller sends a first copy of the second frame addressed to the second original destination on the second interface; and the controller sends a second copy of the second frame addressed to the special predefined address on the second interface.

11. The apparatus set forth in claim 10, wherein the controller adds a predefined encapsulation header to the second copy of the second frame before sending the second copy of the second frame.

12. The apparatus set forth in claim 7, wherein the first copy of the frame is sent with a predefined bit set; and wherein the second copy of the frame is addressed to the original destination and the predefined bit is not set.

13. The apparatus of claim 12, wherein the controller adds a predefined encapsulation header to the second copy of the frame; and wherein the destination address of the encapsulation header is addressed to the original address.

14. A method, comprising:

receiving via an interface by a first bridge from a source, a frame addressed to an original destination address, wherein the first bridge does not reflect frames;

adding a predefined encapsulation header to the frame by the first bridge to generate an encapsulated frame; forwarding by the first bridge the encapsulated frame to a second bridge, wherein the second bridge distributes-via-mirroring frames on a same interface on which the frame was received;

sending by the second bridge a first copy of the encapsulated frame on the same interface that the frame was received, addressed to a special predefined address for bridges that do not reflect frames bridge; sending by the second bridge a second copy of the encapsulated frame on the same interface on which the frame was received addressed to the original destination; and removing the predefined encapsulation header from the encapsulated frame and sending by the second bridge a third copy of the encapsulated frame without the encapsulation header on a second interface different than the interface on which the frame was received addressed to the original destination address.

15. The method of claim 14, wherein a destination address of the encapsulation header added to the frame by the first bridge is an address of the second bridge; wherein a first at least one other address of the encapsulation header is the address of the first bridge; and wherein a second at least one other address of the encapsulation header is set to the special predefined address for bridges that do not reflect frames.

16. The method of claim 15, further comprising:

setting, by the second bridge, the first at least one other address of the encapsulation header of the first copy of the frame to the address of the second bridge and setting, by the second bridge, the second at least one other address of the encapsulation header of the first copy of the frame to the address of the first bridge.

17. The method of claim 16, further comprising:

receiving by the first bridge, the first copy of the frame sent by the second bridge;

determining whether the second at least one other address of the encapsulation header of the first copy of the frame contains the address of the first bridge; and discarding by the first bridge the first copy of the frame responsive to determining the second at least one other address of the encapsulation header of the first copy of the frame contains the address of the first bridge.

* * * * *